Sept. 20, 1966  L. M. GOULD ETAL  3,274,486
AUTOMATIC SYNCHRONIZED STROBOSCOPE
Filed March 1, 1963                                      2 Sheets-Sheet 1

INVENTOR.
LEON M. GOULD
BY WARREN PALEY
S. J. Rotondi & A. J. Dupont

INVENTOR.
LEON M. GOULD
WARREN PALEY
BY
S. J. Rotondi & A. J. Dupont

United States Patent Office 3,274,486
Patented Sept. 20, 1966

3,274,486
AUTOMATIC SYNCHRONIZED STROBOSCOPE
Leon M. Gould, Los Angeles, Calif., and Warren D. Paley, Great Neck, N.Y., assignors, by mesne assignments, to the United States of America as represented by the Secretary of the Army
Filed Mar. 1, 1963, Ser. No. 262,279
3 Claims. (Cl. 324—16)

The present invention relates to devices for investigating the motions of various mechanisms and more particularly to a new and improved system for both triggering a flash lamp circuit and for providing an output signal to drive a direct reading tachometer.

Heretofore, there have been devised various flash producing or stroboscope circuits which may be synchronized with a mechanical device whose motion is under study, and in this manner make the mechanical motion of the device appear to stand still. However, for the lamp or stroboscope to operate correctly, it is necessary that the principal source of light be from that particular light or stroboscope. If light is present from another source during the interval between light flashes, the "freezing" or stopping of the motion will be destroyed.

The presently known types of flash producing or stroboscope circuits suffer from several disadvantages which cannot be overcome using presently available systems. One of the primary disadvantages of conventional flash circuits is their inability to operate at a subharmonic of the operating speed at which the device under study is moving. A flash system that will operate at same subharmonic frequency of the device under study is often necessary. This is especially true where the operating frequency of the device is higher than the normal operating frequency of the flash system. Without subharmonic operation, the flash system would not have sufficient recovery time between triggering pulses, thus making it either impossible to study the motion of the device, or the irregular operation of the flash system will cause a drift in the point being observed in the cycle of motion.

Another disadvantage of conventional stroboscopes using adjustable delay means to control the flash, is that any variation in the operating cycle occurring after the delay means is triggered will not be properly compensated for, thus causing the flash to occur at the wrong point in the cycle of operation.

Another undesirable feature of many present day stroboscope systems is the fact that the flashes, when keyed to the mechanical motion, will occur at the same point in each cycle of motion and can be observed only at that one position.

It is a general object of this invention to provide an automatically synchronized stroboscope system which will permit visual or photographic observation of mechanisms or machinery operating at high rotational speeds.

A further object is to provide a stroboscope system which provides an output to drive a commercial stroboscopic lamp in synchronism with the rotating subject, independently of the subject's rotational velocity.

Another object of this invention is to provide a device which automatically selects a subharmonic of the rotational frequency consistent with maximum average light output from a stroboscopic lamp without exceeding the maximum operating frequency of the lamp.

Yet a further object is to provide a stroboscopic system which will permit the observation of any one of several aspects, or index positions, of the rotating object and allow the particular aspect seen by the observer to be selected or changed by the observer at the time of viewing.

Yet another object of this invention is to provide a stroboscope circuit which provides an output signal to drive a direct reading electronic tachometer.

The novel features that are considered characteristic of this invention are set forth with particularity in the appended claims. The invention itself, however, both as to organization and method of operation, as well as additional objects and advantages thereof, will best be understood from the following description when read in connection with the accompanying drawing, in which:

Referring now to the drawings in which like components have been designated by the same reference numerals and particularly to FIGURE 1, there is illustrated a block diagram of the instant stroboscopic system.

Figure 1:
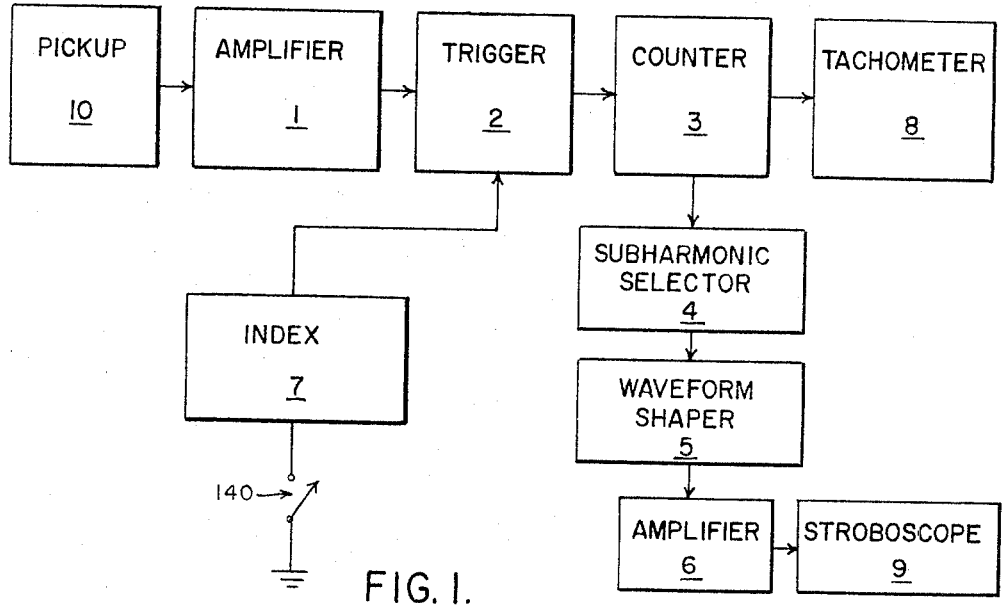
FIGURE 1 is a block diagram of the stroboscope system.

A slotted ferromagnetic cam or disc is mounted concentrically to the shaft of the rotating subject and has several ($n$) slots, one for each desired observation aspect. For typical operation the cam might have eight equally spaced slots ($n=8$), providing eight equally spaced observation aspects. Since the cam or disc forms no part of the instant invention, and various types are known in the art, it should be stated that other signal-producing means may be used. A coded light-reflector or light interrupter may be used with a photo-electric pickup, or a coded commutator may be used with a brush pickup.

With the magnetic cam a magnetic pickup head is mounted close to the slotted cam so that each time a cam slot passes the pickup head, an electrical voltage pulse is generated. The pickup's output pulse repetition rate is $n$ times the rotational speed. Photo-electric, brush or other pickups operate in a manner similar to that of the magnetic pickup described above.

The signal from the pickup designated generally by 10 is then passed to a two stage amplifier 1 which increases the signal level as received from the pickup 10. The amplified pulses are then passed to the trigger stage 2 which shapes both the pulses from amplifier 1 and index pulse generator 7 for driving the counter 3.

Indexing pulse generator 7 is provided to generate pulses, each of which is used to advance the observed aspect by one position. Normally, this stage is left in an inactive state. When indexing is desired, operation of switch 140 activates this generator and when the desired aspect has been attained the switch is released, returning the generator to the inactive state.

A preset electronic counter 3, such as the Model BP-1 of the Nucleonic Co. of America, is provided to count the number of pulses, divide them by $n$, and supply this new output to the tachometer 8 and the subharmonic selector 4. The counter output wave frequency is equal to that of the rotating subject, with its leading edge in synchronism with one of the cam slots. When indexing pulses are present in the counter, the output waveform is advanced by one slot position with respect to the cam for each index pulse added. Thus the output of this preset counter performs a double function, namely that of driving a direct reading electronic tachometer, since it has the same cyclic frequency as the rotating subject, and also providing the input for the subharmonic selector 4.

The subharmonic selector 4 accepts the pulse output of the counter 3 and provides the main drive for the strobe lamp of the stroboscope 9. This selector consists of a monostable multivibrator having a recovery time equal to or slightly larger than one period of the maximum operating frequency of the strobe lamp being used. With such a recovery time, the maximum repetition rate at which the subharmonic selector can be driven cannot exceed the maximum operating rate of the lamp. The leading edge of the selector output is triggered by the leading edge of the output of counter 3 and is therefore in synchronism with a particular cam slot.

Output waveform shaper 5, which consists of a monostable multivibrator having a recovery time appreciably smaller than that of the selector 4, is provided to insure that the output waveform provides sufficient time for the charge and discharge phases of the strobe lamp's operation. This stage is especially useful when the rotational frequency is at or near a multiple of the maximum output frequency of the subharmonic selector. Thus the output of the selector 4 is modified by the waveform shaper 5 and, after passing through a phase inverter and amplifier 6, this output is used to drive the strobe lamp of the stroboscope 9. Amplifier 6 is required to provide the necessary polarity and amplitude to actuate the strobe lamp or flashing unit.

Briefly, in operation, this device functions as follows. Whenever the subject to be observed is rotating, $n$ pulses per revolution are generated in the pickup head, one for each slot in the cam mounted on the rotating shaft. After being amplified and shaped, the pickup output frequency is divided by $n$ in the preset electronic counter. The counter output frequency, equal to the rotational frequency of the cam is divided by a variable integral divisor in the subharmonic selector. Although the subharmonic selector's output frequency never exceeds a predetermined value, it is always an integral sub-multiple of the rotational frequency. After shaping and amplification, the subharmonic selector output is used to trigger a strobe lamp. The nature of the circuitry is such that the trigger pulse to the strobe lamp occurs when a particular slot is passing a pickup head. To shift the observation aspect, additional pulses from the indexing pulse generator are fed to the counter. For each such pulse, the strobe flash will be advanced in position by one cam slot. The output of the preset counter is also used to drive a tachometer, since it has the same frequency as the rotating subject.

Figure 3:
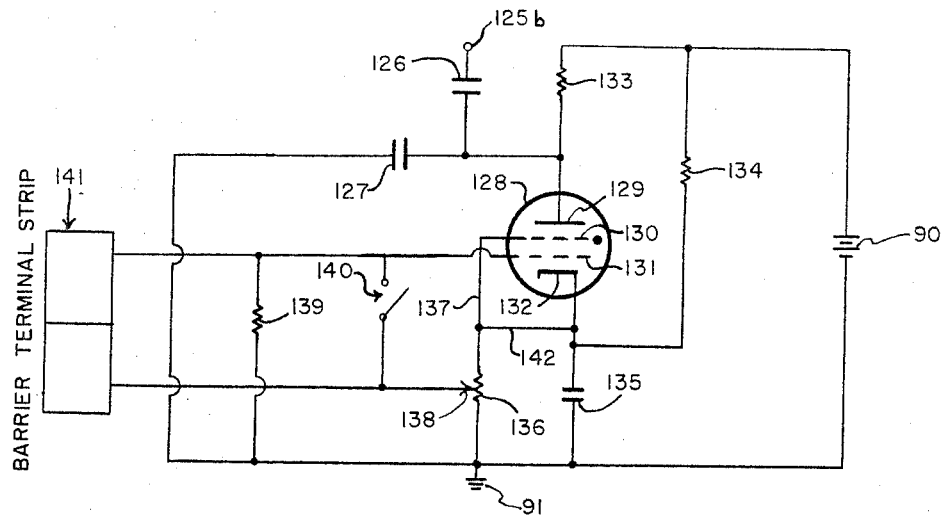
FIGURE 3 is a circuit diagram of an indexing pulse generator used in accordance with this invention.
Figure 2:
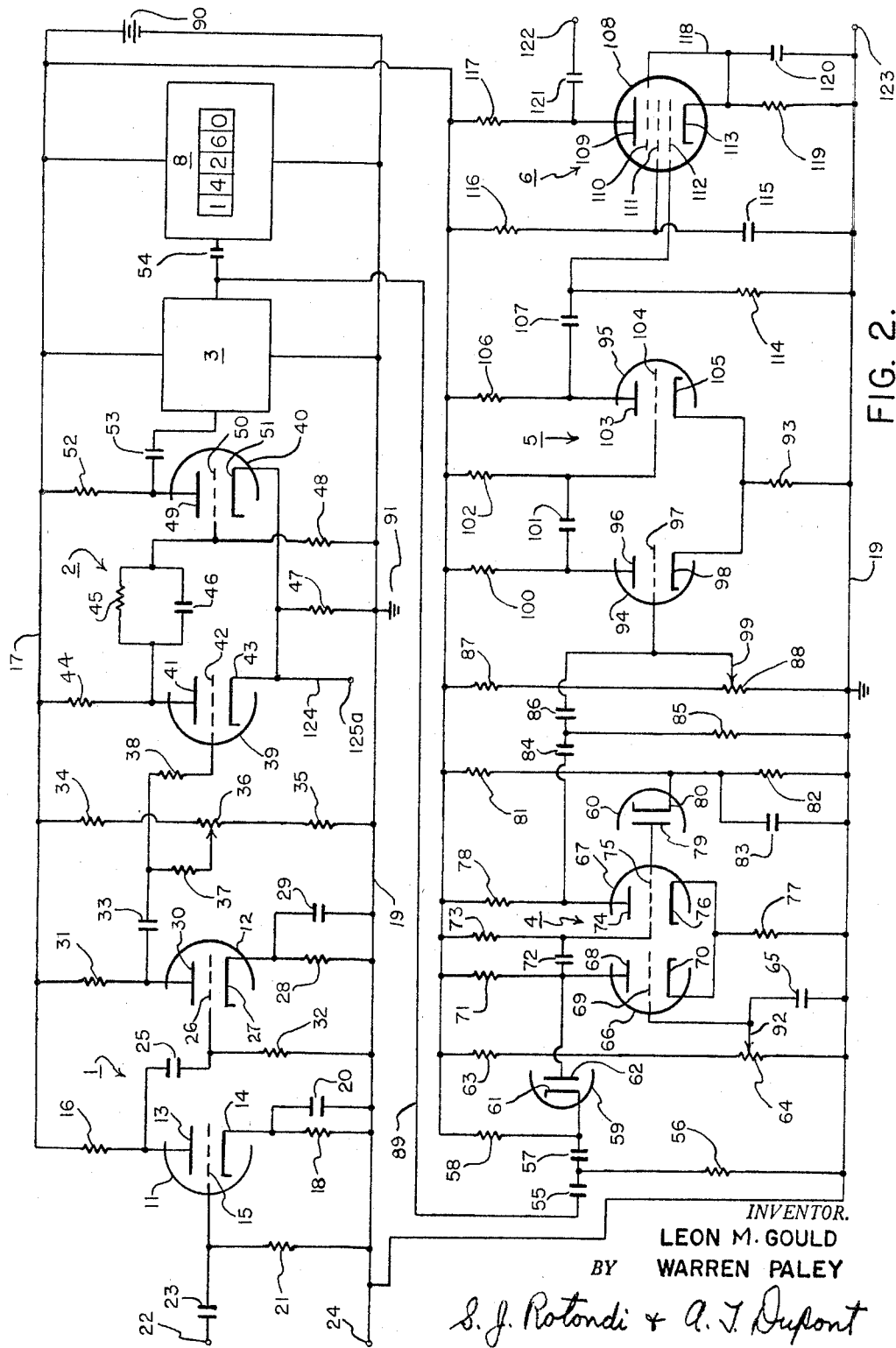
FIGURE 2 is a circuit diagram of the major portion of the system.

More specifically the stroboscope circuit is arranged as shown by the circuit diagrams of FIGURES 2 and 3. In FIGURE 2 the two stage amplifier 1 consists of a duo-triode having sections 11 and 12. Section 11 has an anode 13, cathode 14 and grid 15. The anode 13 is connected through a resistor 16 to a source of positive potential exemplified by the battery 90, but which more normally would be a power supply such as the Model 28 manufactured by the Lambda Electronics Corp. Conductor 17 connects the load resistor 16 to the positive terminal of the power supply 90. Line 19 is grounded at 91. Connected in parallel with resistor 18 is a bypass capacitor 20. The grid 15 of tube 11 is connected through a bias resistor 21 to the negative terminal of power supply 90. The control grid 15 is also connected to input terminal 22 through a coupling capacitor 23. A second input terminal 24 is connected to conductor 19. The second stage of amplifier 1 consists of tube section 12 which includes plate 30 connected to conductor 17 through load resistor 31, cathode 27 connected to ground conductor 19 through a parallel resistance-capacitance 28, 29 and control grid 26 connected to conductor 19 through bias resistor 32 and to plate 13 of tube 11 through coupling capacitor 25.

The amplified output consisting of the signal pulses are then passed on to trigger 2 through coupling condenser 33. To provide a proper voltage level to the trigger circuit input, a potential divider consisting of resistors 34, 35 and 37 along with potentiometer 36 are connected between the amplifier output and trigger input.

The pulse shaper or trigger stage 2 also consists of a duo-triode having tube sections 39 and 40 connected to provide a multivibrator circuit. Tube section 39 comprises an anode 41 connected to the power supply connector 17 through a load resistor 44, a grid 42 connected through input resistor 38 to the coupling capacitor 33, and a cathode 43 connected to cathode 51 of tube section 40 and to ground through resistor 47. Plate 41 is further connected to the grid 50 of tube 40 through a parallel resistance-capacitance 45, 46. Plate 49 of tube 40 is connected through load resistor 52 to conductor 17 and the shaped pulses appearing at the plate are connected to counter 3 through a coupling capacitor 53. Grid 50 is further connected to ground conductor 19 through a resistor 48. The RC constant of the multivibrator is chosen such that the length of the output pulse appearing at plate 49 is shorter than the shortest possible signal pulse which could be generated by the cam rotation and number of slots.

The output pulses of trigger 2 are then counted and divided by the number of slots in the cam by the preset counter 3 and passed on to tachometer 8 through a coupling capacitor 54 and to the subharmonic selector 4 through coupling condenser 55 via conductor 89.

Subharmonic selector 4 consists of duo-diode 59, 60 and duo-triode 66, 67 connected in such a way as to provide a mono-stable multivibrator. A proper voltage level at the input of diode 59 is supplied by resistors 56 and 58, with capacitor 57 supplying the proper input impedance for cathode 61. Anode 62 of diode 59 is connected to plate 68 of tube section 66 and provides for the initiation of the multivibrator operation. Resistor 63 has one of its ends connected to conductor 17, the other end being connected to a potentiometer 64. Wiper arm 92 of potentiometer 64 is connected to grid 69 of tube 66 and provides the control grid voltage for tube operation. Capacitor 65 provides an A.-C. bypass for the potentiometer section between wiper 92 and ground conductor 19. Plate 68 of tube 66 is connected to load resistor 63 and is also connected to grid 75 of tube 67 through a capacitor 72. Resistor 73 is provided in this plate-grid circuit for producing a proper time constant. Cathodes 70 and 76 of the duo-triode are connected together and through common resistor 77 to conductor 19. Plate 74 of tube 67 is connected to the power supply 90 through plate resistor 78 and the output at this plate is transferred to shaper 5 through capacitor 84. Diode 60 is provided, as is diode 59, for operation at proper voltage levels and sharp cut-off characteristics. Anode 79 of diode 60 is connected to grid 75 of tube 67 while the cathode 80 is connected to the junction of voltage divider resistors 81, 82 and capacitor 83 which is in parallel with resistor 82. Resistor 85 is connected between capacitor 84 and conductor 19 and along with capacitor 86, which is connected between this resistor and grid 97 of tube section 94, provides a proper input impedance to shaper 5. The provision of a proper voltage at the input of trigger 5 is provided by resistor 87 and potentiometer 88. The selection of a desired voltage operating point is accomplished by varying wiper arm 99 which is connected to grid 97 of tube 94.

The pulse length of the output of the multivibrator 66, 67 as mentioned previously, is adjusted so that it is equal to or slightly larger than the period of maximum operating frequency of the strobe lamp. The RC constant of the multivibrator can be computed once this maximum frequency of the strobe lamp is known.

Wave shaper 5 consists of duo-triode 94, 95 connected to operate as a multivibrator, but having a short pulse output which is equal to the charge and discharge phases of the strobe lamp. Plate 96 of tube 94 is connected to plate resistor 100 and the grid 104 of tube 95 through capacitor 101. Resistor 102 is provided in this plate-grid circuit to give the shaper 5 the desired time constant. Cathodes 98 and 105 of tubes 94 and 95 are connected together and to ground conductor 19 through resistor 93. Plate 103 of tube 95 is connected to power supply 90 through resistor 106 and is coupled to amplifier 6 through coupling capacitor 107.

Amplifier 6 accepts the pulses from the waveform shaper 5 and provides the output necessary to drive the strobe lamp. This stage consists of a pentode tube 108 having a plate 109, suppressor grid 110, screen grid 111, control grid 112 and cathode 113. Plate 109 is connected to the power supply conductor 17 through plate resistor 117. Suppressor grid 110 is connected to cathode 113 by means of conductor 118 and is thus kept at the cathode potential. Voltage regulating resistor 116 is connected between the screen grid 111 and conductor 17, with capacitor 115 connected between the junction of grid 110 and resistor 116, and conductor 19 to perform a filtering action. Resistor 114 provides the necessary grid leak. The cathode 113 is connected to conductor 19 through resistor 119 with capacitor 120 being in parallel to resistor 119 and providing the necessary bypass. The output of the inverter and amplifier 6 is coupled to output terminal 122 through a condenser 121. A further output terminal 123 is provided on ground conductor 19.

In FIGURE 3 there is shown a circuit diagram of the indexing pulse generator 7. This stage consists of a gas-filled tetrode 128 including plate 129, screen grid 130, control grid 131, and cathode 132. Plate 129 is connected to the power supply 90 through plate resistor 133. Screen grid 130 is connected to cathode 132 through conductors 137 and 142. Cathode 132 is connected to power supply 90 through load resistor 134 and to ground 91 through capacitor 135. Variable resistance 136 is provided between cathode 132 and ground 91 to supply the proper initiating voltage for tube 128. Voltage is maintained on grid 131 by use of the grid leak resistor 139. Barrier terminal strip 141 is provided between wiper arm 138 and grid 131, while switch 140, which discharges this grid-cathode circuit, is connected in parallel to barrier terminal strip 141 which is utilized for connecting a remote control switch, not shown, in parallel with switch 140. Filtering condenser 127 is connected between plate 128 and ground 91.

When it is desired to advance the observation aspect one position on the rotating cam, switch 140 is closed causing a discharge of the cathode-grid circuit of tube 128. The tube then becomes inoperative and an output pulse is transferred from the plate 129 through coupling capacitor 126 terminals 125b and 125a, and conductor 124 (see FIGURE 2), to the cathodes of the tubes 39, 40 of trigger 4. Thus it is seen that means are provided to permit observation at any desired point of rotation of the cam by providing pulsing means to advance the observation aspect as desired.

Although a specific embodiment of this invention has been illustrated and described, it will be understood that this is but illustrative and that various modifications may be made therein without departing from the spirit of this invention and the scope of the claims.

What is claimed is:

1. A stroboscope system for investigating rotation comprising a pickup device providing a source of pulses whose repetition rate is an integer times the rotational speed of the mechanism being observed, amplifying means connected to said pickup device and producing an amplified pulse output, trigger means connected to said amplifying means for producing shaped pulses, preset electronic counter means having input means connected to said trigger means for counting said pulses, a subharmonic selector circuit comprising a monostable multivibrator connected to said preset counter means producing output pulses of predetermined length in response to the output of said preset electronic counter means, a waveform shaper connected to said selector circuit which modifies said predetermined pulse, a strobe lamp, further amplifier means, said further amplifier means coupling said waveshaper with said strobe lamp, and an indexing pulse generator, said indexing pulse generator connected to said trigger means whereby pulses are provided to advance the observation aspect of said stroboscope system.

2. A stroboscope system as defined in claim 1 further comprising a tachometer connected to said counter to provide a visual indication of said rotation.

3. A stroboscope system as defined in claim 1 further comprising a mechanical switch in said indexing pulse generator which, when activated, will advance said observation aspect.

References Cited by the Examiner

UNITED STATES PATENTS

| | | | |
|---|---|---|---|
| 2,485,888 | 10/1949 | Jordan | 88—14 |
| 2,711,647 | 6/1955 | Ongaro | 73—466 |
| 3,026,449 | 3/1962 | Rappaport | 315—241 |
| 3,111,555 | 11/1963 | Dykeman | 88—14 |

WALTER L. CARLSON, *Primary Examiner.*

M. J. LYNCH, *Assistant Examiner.*